April 15, 1930.   H. WYDLER   1,754,589
LIQUID MEASURING DEVICE PROVIDED WITH A CONTINUOUS COUNTER
Filed Feb 18, 1929
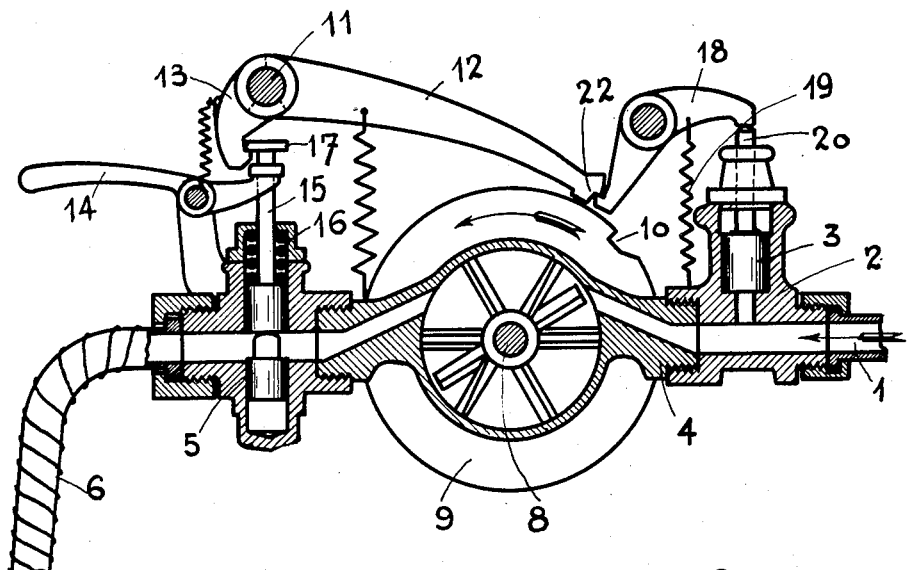
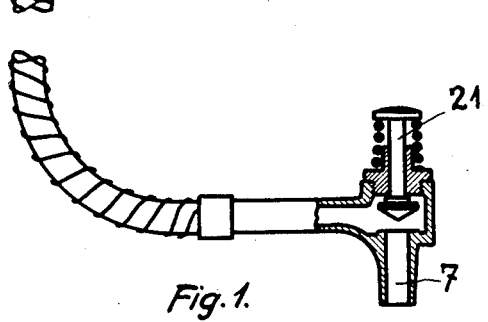
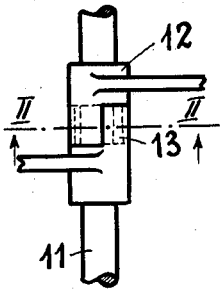
Fig. 1.
Fig. 2.
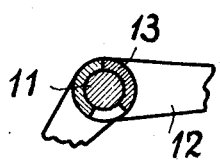
Fig. 2a.

Patented Apr. 15, 1930

1,754,589

UNITED STATES PATENT OFFICE

HERMANN WYDLER, OF BERN, SWITZERLAND, ASSIGNOR TO THE FIRM SAUSER S. A., OF SOLEURE, SWITZERLAND

LIQUID-MEASURING DEVICE PROVIDED WITH A CONTINUOUS COUNTER

Application filed February 18, 1929, Serial No. 340,916, and in Switzerland February 20, 1928.

The present invention relates to a liquid dispensing device provided with a passage counter that is a counter moved directly by the passing liquid.

Similar devices are already known having a check cock between supply tank and counter by means of which the flow of liquid has to be interrupted when the desired quantity of liquid has passed by. This quantity of liquid may be read off a dial provided with a hand moved by the counter, but it is very difficult for the attendant to draw off exactly the desired quantity if he fails shutting the cock in the very moment when the pointer marks the zero.

It is the object of the present invention to propose a dispensing device having means actuated by a throttling resistance created within the discharge pipe which means will stop the discharge of liquid and with it will stop the counter at the end of a started measuring unity. Thus for instance, if it is desired to draw off a quantity of liquid for which the counter marks 360°, it will suffice to cause the throttling resistance in the discharge pipe to become operative right after the hand on the dial has left the mark 359°. The counter will then be stopped at 360° and will correspond exactly to the delivered quantity of liquid.

Thus the invention consists in means which will stop the counter at the end of a started measuring unity as soon as a throttling device is actuated within the discharge pipe. A preferred embodiment of the invention is described in the following specification and in the drawing where Fig. 1 is a diagram of the whole device embodying the present invention, while Fig. 2 shows a detail and Fig. 2ª a cross section on line II—II of the Fig. 2.

The liquid inlet is marked with 1. It is connected to a cylinder 2 which has a slidably arranged piston 3 and which is attached to a passage counter 4. The outlet of this counter is shut by an outlet cock 5 unto which is screwed the flexible hose 6 usually employed in liquid fuel stations. The delivery cock is marked with 7.

A disk 9 is keyed to the axis 8 of the passage counter. This disk possesses a notch 10 which may be engaged by the nose of a snapping arm 12. This arm can be taken along by a catch 13 mounted likewise, like arm 12, loose on the axis 11. This arrangement is made comprehensible in the plan of Fig. 2 and the sectional view 2ª. The mentioned movement of the catch 13 will take place each time when the plug 15 of the outlet cock 5 is lifted up by means of the handle 14 contrary to the effect of spring 16. The plug will move in a straight line. It carries at its top a head 17 which when handle 14 is pressed down will push the catch 13 aside and let it snap in at its underside.

The snap arm 12 is held in the position of the Fig. 1 by a second catch 18 which is under the effect of a spring 19 and which can be moved by the piston rod 20 of the piston 3 contrary to the effect of said spring. The discharge cock 7 can be shut by hand either totally or partly by pressing the valve stem 21. It serves by the way also for inserting a resistance into the discharge conduit when the continuous counter has to be arrested.

The device operates as follows:

In the position of rest of the device the outlet cock 5 is shut and the handle arm 14 has assumed its highest throw. The catch 13 is disengaged from the head 17 and the hook 22 of the snap arm 12 has dropped into the notch 10. The piston 3 has the position shown in Fig. 1 because there is not yet any pressure in the inlet conduit. Now if the outlet cock 5 is opened by means of handle 14 the head 17 will have risen to the height of catch 13 and when a pressure in the conduit 1 is produced by starting a supply pump the counter will move and the disk 9 be rotated in an anti-clockwise sense so that hook 22 will move on the circular part of its circumference whereby catch 13 is swung into engagement with head 17 and catch 18 will be enabled to engage the hook 22 so as to keep the arm 12 out of engagement with the notch of the revolving disk 9. This is the position of Fig. 1, in which any desired quantity of liquid can be drawn off from the counter. Now if it is desired to stop the delivery exactly at the end of a measuring unity while this unity has been already started, a result which will be obtained when the outlet cock 5 closes simultaneously with the dropping of hook 22 into the notch 10 of the disk 9, the attendant has to bear only from time to time on the valve 21 of the discharge cock. Then a stowing of the liquid will take place which will be felt so far back as piston 3. This stowing will move the piston 3 upwards so as to throw catch 18 out of engagement with hook 22 and to release snap arm 12. Now hook 22 will glide freely over the circular circumference of the disk 9, until it drops into the notch 10 and stops the counter. The arm 12 swinging in a clockwise sense will throw catch 13 out of engagement with head 17 and plug 5 of the outlet cock will be shut under the effect of spring 16. The delivery of liquid being stopped the supply pump may be stopped also by means not shown. Thus each supply of liquid will have been arrested exactly when the desired quantity has been delivered.

What I claim is:

1. In a liquid dispensing device and in combination a discharge conduit, a passage-counter inserted into this conduit and associated means whereby the counter can only be stopped at the zero position of a measuring unity, throttling means at the delivery end of said conduit and means adapted to engage with said stopping means of the counter whenever said throttling means are made operative.

2. In a liquid dispensing device and in combination a discharge conduit, a passage-counter inserted into this conduit and associated means whereby the counter can only be stopped at the zero position of a measuring unity, a piston check valve right after said counter, throttling means at the delivery end of said conduit and means operatively connected with said check valve and adapted to engage with said stopping means of the counter whenever said throttling means are made operative.

3. In a liquid dispensing device and in combination, a discharge conduit, a passage-counter inserted into this conduit, and provided with a notched disk keyed to its axis as means for marking the zero position of a measuring unity, a piston check valve right after said counter, a head provided at the top end of the piston of said valve, a pivoted and spring-controlled snap arm having a hook capable of engaging said notch, a spring controlled catch controlled by said snap arm, and a hook provided thereon capable of engaging said head in the open position of the check-valve, a pivoted handle adapted to lift up the piston of the check valve by hand, and means adapted to maintain the inoperative position of said snap arm and depending on the pressure in the discharge conduit.

4. In a liquid dispensing device and combination a discharge conduit, a passage-counter inserted into this conduit and provided with a notched disk keyed to its axis as means for marking the zero position of a measuring unity, a piston check-valve right after said counter, a head provided at the top end of the piston of said valve, a pivoted and spring-controlled snap arm having a hook capable of engaging said notch, a spring controlled catch controlled by said snap arm, and a hook provided thereon capable of engaging said head in the open position of the check-valve, a pivoted handle adapted to lift up the piston of the check-valve by hand, and means for maintaining the inoperative position of said snap arm comprising, a branch neck inserted into the discharge conduit right before the counter and a piston fitted therein projecting with a pin to the outside, and a spring-controlled two armed catch bearing with one arm on said pin and capable of engaging with its other hooked arm said snap arm.

In testimony whereof I affix my signature.

HERMANN WYDLER.